United States Patent
Lee et al.

(10) Patent No.: US 8,903,148 B2
(45) Date of Patent: Dec. 2, 2014

(54) X-RAY IMAGING APPARATUS AND METHOD OF UPDATING A PIXEL MAP

(75) Inventors: Ho Jun Lee, Gyeonggi-do (KR); Jin Ki Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 105 days.

(21) Appl. No.: 13/541,820

(22) Filed: Jul. 5, 2012

(65) Prior Publication Data

US 2013/0022258 A1    Jan. 24, 2013

(30) Foreign Application Priority Data

Jul. 18, 2011   (KR) ........................ 10-2011-0070931

(51) Int. Cl.
G06K 9/00      (2006.01)
G06T 5/00      (2006.01)

(52) U.S. Cl.
CPC ....... *G06T 5/002* (2013.01); *G06T 2207/10116* (2013.01); *G06T 2207/30004* (2013.01); *Y10S 128/922* (2013.01)
USPC .................. 382/128; 128/922; 378/4

(58) Field of Classification Search
USPC ......... 382/100, 128, 131, 132, 162, 163, 167, 382/170, 190, 195, 201, 274, 275; 348/92, 348/135, 607, 615; 345/581, 589, 616, 617, 345/647, 440, 428, 612, 618
See application file for complete search history.

(56) References Cited

U.S. PATENT DOCUMENTS

| | | | | |
|---|---|---|---|---|
| 6,663,281 B2* | 12/2003 | Aufrichtig et al. | ............ | 378/207 |
| 6,949,568 B2* | 9/2005 | Moran et al. | .................. | 514/312 |
| 7,301,673 B2* | 11/2007 | Kang | ............................ | 358/3.03 |
| 7,602,992 B2* | 10/2009 | Kondo et al. | .................. | 382/274 |
| 7,684,640 B2* | 3/2010 | Zhao et al. | ..................... | 382/274 |
| 8,218,087 B2* | 7/2012 | Lo et al. | ........................ | 348/673 |
| 2003/0058998 A1* | 3/2003 | Aufrichtig et al. | ............ | 378/207 |
| 2010/0283874 A1* | 11/2010 | Kinrot | ........................... | 348/242 |
| 2013/0022258 A1* | 1/2013 | Lee et al. | ...................... | 382/132 |

FOREIGN PATENT DOCUMENTS

| | | | |
|---|---|---|---|
| JP | 2008-306237 A | 12/2008 |
| KR | 10-2009-0014035 A | 2/2009 |

* cited by examiner

*Primary Examiner* — Anand Bhatnagar
(74) *Attorney, Agent, or Firm* — Cha & Reiter, LLC

(57) ABSTRACT

An X-ray imaging apparatus and a method of updating a pixel map correct a bad pixel of an X-ray transmission image. An X-ray transmission image is generated by detecting an X-ray penetrating an object, and it is determined whether a difference between a value of each one of the pixels forming the X-ray transmission image and a value of a nearby pixel adjacent to the each one of the pixels is equal to or greater than a reference value. A pixel having a value representing a difference equal to or greater than the reference value is determined as a candidate for a bad pixel. A message is displayed which requests a selection of whether to determine if the candidate is a bad pixel. The pixel map is updated by reflecting the determined bad pixel on the pixel map.

17 Claims, 6 Drawing Sheets

X-RAY IMAGING APPARATUS AND METHOD OF UPDATING A PIXEL MAP

CLAIM OF PRIORITY

This application claims, pursuant to 35 U.S.C. §119(a), priority to and the benefit of the earlier filing date of Korean Patent Application No. 2011-0070931, filed on Jul. 18, 2011 in the Korean Intellectual Property Office, the entire disclosure of which is incorporated herein by reference.

BACKGROUND OF THE INVENTION

1. Field of the Invention

The present invention relates to an X-ray imaging apparatus, and more particularly, to a method of updating a pixel map for removing a bad pixel of an X-ray transmission image.

2. Description of the Related Art

An X-ray imaging apparatus is designed to diagnose disease by radiating an X-ray to an animal body or a human body and detecting the X-ray penetrating the body so that an image of an inner structure is obtained without cutting into the body to expose such an inner structure.

An X-ray is an electromagnetic wave of a strong transmittance that is emitted from collision of an electron against a target for generating X-rays. In general, an X-ray tube configured to generate an X-ray includes a filament emitting a thermal electron and an electrode that forms a strong electric field by use of a high voltage. If a high voltage generated from a high voltage supply device is supplied to an X-ray tube, a filament forming a cathode emits thermal electrons. The thermal electron is directed by a strong electric field to a collision with an anode as the target, and thus an X-ray is generated from a local-sized region of the anode where the collision takes place.

In general, the X-ray imaging apparatus includes an X-ray tube to generate X-rays, a radiation region adjusting apparatus for adjusting a region being radiated by X-rays, and a detecting unit configured to detect X-rays penetrating an object.

For a digital X-ray imaging apparatus, a bad pixel may be generated in an image due to a physical deficiency of the detection unit. Such a bad pixel is subject to a correction through image processing after an X-ray transmission image is obtained.

SUMMARY OF THE INVENTION

Therefore, it is an aspect of the present invention to provide an X-ray imaging apparatus capable of correcting a bad pixel of an X-ray transmission image of an object, and a method of updating a pixel map forming the image.

Additional aspects of the invention will be set forth in part in the description which follows and, in part, will be obvious from the description, or may be learned by practice of the invention.

In accordance with one aspect of the present invention, a method of updating a pixel map is as follows. An X-ray transmission image is generated by detecting an X-ray penetrating an object. It is determined whether a difference between a value of each one of the pixels forming the X-ray transmission image and a value of a nearby pixel adjacent to each one of the pixels is equal to or greater than a reference value by comparing the value of each one of the pixels with the value of the nearby pixel. A pixel having a value representing a difference equal to or greater than the reference value is determined to be a candidate for a bad pixel among the pixels if the difference is equal to or greater than the reference value. A message is displayed that requests a selection of whether to determine the candidate for the bad pixel as the bad pixel. The pixel map is updated by reflecting the determined bad pixel on the pixel map if the candidate for the bad pixel is determined as the bad pixel.

In the determining whether the difference between a value of each one of the pixels forming the X-ray transmission image and a value of a nearby pixel adjacent to each one of the pixels is equal to or greater than a reference value, it is determined whether a predetermined pixel among the pixels forming the X-ray transmission image is greater in value than a value for an area surrounding the predetermined pixel by the reference value and a value greater than the reference value.

The area surrounding the predetermined pixel includes at least one pixel.

In the determining of a pixel having a value representing a difference equal to or greater than the reference value as a candidate for a bad pixel among the pixels if the difference is equal to or greater than the reference value, a predetermined pixel among the pixels forming the X-ray transmission image is determined as the candidate for the bad pixel if the predetermined pixel has a value greater in value than a value of an area surrounding the predetermined pixel by the reference value and a value greater than the reference value.

In the displaying of a message requesting a selection of whether to determine the candidate for the bad pixel as the bad pixel, a pixel map, which indicates the candidate for the bad pixel such that a user is enabled to verify whether the candidate for the bad pixel corresponds to the bad pixel, and a message, which requests a selection of whether to determine the indicated candidate for the bad pixel as the bad pixel, are displayed on a display unit.

The updating of the pixel map by reflecting the determined bad pixel on the pixel map if the candidate for the bad pixel is determined as the bad pixel includes updating the pixel map by indicating the determined bad pixel as a bad pixel on the pixel map, and storing the updated pixel map.

The value of the pixel is a value representing a brightness of the pixel.

In accordance with another aspect of the present invention, a method of updating a pixel map is as follows. With respect to a plurality of X-ray transmission images, it is determined whether a difference between a value of each one of the pixels forming each of the plurality of X-ray transmission images and a value of a nearby pixel adjacent to the each one of the pixels is equal to or greater than a reference value by comparing the value of the each one of the pixels with the value of the nearby pixel. A pixel having a value representing a difference equal to or greater than the reference value is determined as a candidate for a bad pixel among the pixels if the difference is equal to or greater than the reference value.

A weight is assigned to the pixel, which is determined as the candidate for the bad pixel, with the weight being in proportion to a frequency of determinations by which the pixel is determined as the candidate for the bad pixel. A message which requests a selection of whether to determine the candidate for the bad pixel as the bad pixel is displayed. The pixel map is updated by reflecting the determined bad pixel on the pixel map if the candidate for the bad pixel is determined as the bad pixel.

In the determining whether the difference between a value of each one of the pixels forming the X-ray transmission image and a value of a nearby pixel adjacent to the each one of the pixels is equal to or greater than a reference value with respect to a plurality of X-ray transmission images, it is determined whether a predetermined pixel of the pixels forming the X-ray transmission image is greater in value than a value of an area surrounding the predetermined pixel by the reference value and a value greater than the reference value.

The area surrounding the predetermined pixel includes at least one pixel.

In the determining of a pixel having a value that shows a difference equal to or greater than the reference value as a candidate for a bad pixel among the respective pixels if the difference is equal to or greater than the reference value, a predetermined pixel among the pixels forming the X-ray transmission image is determined as the candidate for the bad pixel if the predetermined pixel is greater in value than a value of an area surrounding the predetermined pixel by the reference value and a value greater than the reference value.

In the displaying of a message requesting a selection of whether to determine the candidate for the bad pixel as the bad pixel, a pixel map, which shows the candidate for the bad pixel such that a user is enabled to verify whether the candidate for the bad pixel corresponds to the bad pixel, and a message, which requests a selection of whether to determine the indicated candidate for the bad pixel as the bad pixel, are displayed on a display unit.

The updating of the pixel map by reflecting the determined bad pixel on the pixel map if the candidate for the bad pixel is determined as the bad pixel includes updating the pixel map by indicating the determined bad pixel as a bad pixel on the pixel map, and storing the updated pixel map.

The value of the pixel is a value representing a brightness of the pixel.

In accordance with another aspect of the present invention, an X-ray imaging apparatus includes a detection unit and a control unit. The detection unit is configured to detect an X-ray penetrating an object such that an X-ray detection signal is output. The control unit is configured to generate an X-ray transmission image of the object from the X-ray detection signal that is output from the detection unit, to determine a candidate for a bad pixel with respect to each one of the pixels forming the X-ray transmission image, to display a message requesting a selection of whether to determine the candidate for the bad pixel as the bad pixel, and to update a pixel map by reflecting the determined bad pixel on the pixel map if the candidate for the bad pixel is determined as the bad pixel.

The control unit determines whether a predetermined pixel of the pixels forming the X-ray transmission image is greater in value than a value of an area surrounding the predetermined pixel by the reference value and a value greater than the reference value, and determines the predetermined pixel as the candidate for the bad pixel if the predetermined pixel is equal to or greater than a value of an area surrounding the predetermined pixel by the reference value and a value greater than the reference value.

The area surrounding the predetermined pixel includes at least one pixel.

The control unit displays a pixel map, which indicates the candidate for the bad pixel such that a user is enabled to verify whether the candidate for the bad pixel corresponds to the bad pixel, and a message, which requests a selection of whether to determine the indicated candidate for the bad pixel as the bad pixel, on a display unit.

The control unit updates the pixel map by indicating the determined bad pixel as a bad pixel on the pixel map, and stores the updated pixel map.

As described above, a pixel map is updated in real time, so that a bad pixel of an X-ray transmission image of an object is easily corrected and a diagnosis error caused by a bad pixel is reduced.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION OF THE INVENTION

Hereinafter, preferred embodiments of the present invention will be described with reference to the accompanying drawings. This invention may, however, be embodied in many different forms and should not be construed as limited to the exemplary embodiments set forth herein. The same reference numbers are used throughout the drawings to refer to the same or like parts. In the following description, a detailed explanation of known related functions and constructions may be omitted to avoid unnecessarily obscuring the subject matter of the present invention. Also, terms described herein, which are defined considering the functions of the present invention, may be implemented differently depending on user and operator's intention and practice. Therefore, the terms should be understood on the basis of the disclosure throughout the specification. The principles and features of this invention may be employed in varied and numerous embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

Figure 1:
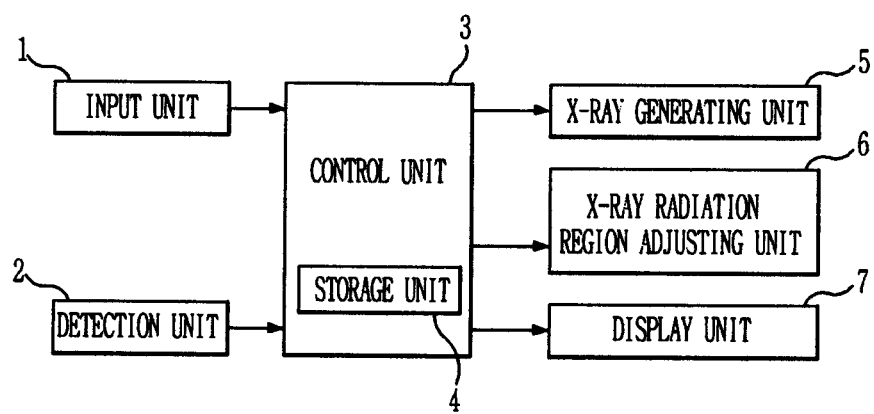
FIG. 1 is a block diagram illustrating the configuration of an X-ray imaging apparatus according to an exemplary embodiment of the present invention.

FIG. 1 is a block diagram illustrating the configuration of an X-ray imaging apparatus according to an embodiment of the present invention.

An X-ray imaging apparatus according to the exemplary embodiment of the present invention includes an input unit 1 to receive a command for an operation of the X-ray imaging apparatus, an X-ray generating unit 5 to generate X-rays, an X-ray radiation region adjusting unit 6 to adjust a radiation path of X-rays generated from the X-ray generating unit 5 and a region being radiated by the X-rays, a detection unit 2 to detect X-rays penetrating an object such as a patient, a display unit 7 on which an X-ray transmission image is displayed based on the X-rays detected by the detection unit 2, and a control unit 3 to control the overall operation of the X-ray imaging apparatus.

The input unit 1 is designed such that a user inputs a command for X-ray photography or a command for adjusting a region radiated by X-rays. The user, such as a technician or operator, performs X-ray photography by inputting various types of commands for the X-ray photography through the input unit 1.

The X-ray generating unit 5 generates an X-ray which is an electromagnetic wave having a short wavelength and a strong transmittance which is emitted by a collision of a high speed electron against a target which generates X-rays. The X-ray generating unit 5 includes a filament emitting thermal electrons and an electrode forming an electric field by use of a high voltage.

As the high voltage generated from a high voltage supply device is applied to the X-ray generating unit 5, thermal electrons are emitted from the filament that forms a cathode. The emitted thermal electrons are directed by a strong electric field to collide with an anode as the target. An X-ray is generated at a local region of the anode where the collision of the thermal electron has occurred. The X-ray radiation region adjusting unit 6 is disposed in front of the X-ray generating unit 5. The X-ray generating unit 5 includes an aperture, which is configured to adjust a radiation path of X-rays and a region radiated by X-rays, so that X-rays are transmitted to the X-ray radiation region adjusting unit 6 through the aperture. The aperture includes a material, for example, lead and tungsten, capable of attenuating X-rays. Similar to an aperture of a camera, the aperture of the X-ray radiation region adjusting unit 6 adjusts a region radiated by the X-ray in the form of, for example, a circle. In this manner, the X-ray generated from the X-ray generating unit 5 is radiated to the X-ray radiation region adjusting unit 6 in front of the X-ray generating unit 5 after being adjusted in the radiation path and the radiation region by the aperture.

The X-ray radiation region adjusting unit 6 includes an aperture configured to adjust a radiation path and a radiation region of X-rays. The aperture of the X-ray radiation region adjusting unit 6 adjusts a radiation path and a radiation region of X-rays in a similar manner to the aperture of the X-ray generating unit 5.

The detection unit 2 is an apparatus designed to detect X-rays, which have been radiated from the X-ray radiation region adjusting unit 6 and then penetrated an object. The detection unit 2 converts the transmission of X-rays into an electric signal and transmits the electric signal to the control unit 3. The detection unit 2 may include a thin film transistor array substrate and an optical sensor.

The display unit 7 may display various types of information related to X-ray photography so that the X-ray photography of an object is easily performed. The display unit 7 displays an X-ray transmission image of an object that is output from the detection unit 2.

The control unit 3 receives various commands that are input related to X-ray photography of an object, and controls the operations of the X-ray generating unit 5, the X-ray radiation region adjusting unit 6, and the display unit 7 according to the received commands. In addition, the control unit 3 receives the electric signal transmitted from the detection unit 2 to control the display unit 7 such that an X-ray transmission image of an object is displayed on the display unit 7.

Figure 2:
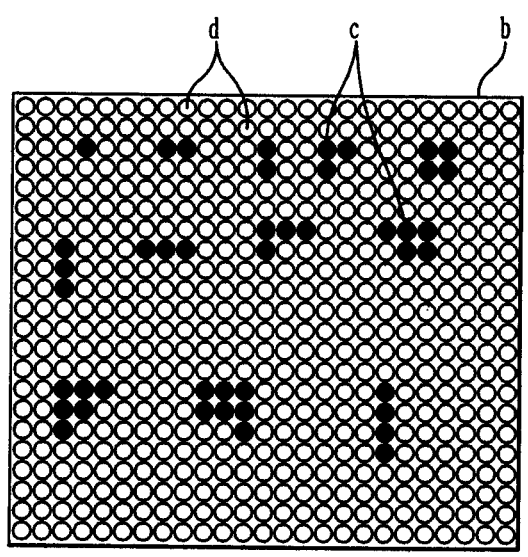
FIG. 2 is a view illustrating a pixel map.
Figure 3:
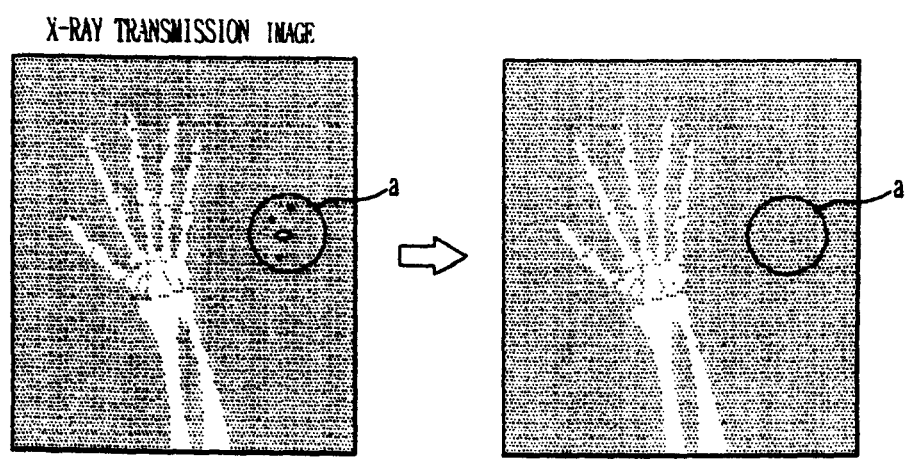
FIG. 3 is a view illustrating an X-ray transmission image having a bad pixel and an X-ray transmission image having a bad pixel removed.

In addition, the control unit 3 includes a storage unit 4 to store a pixel map (b), as shown in FIG. 2. The pixel map (b) represents a map, which is provided by a manufacturer of an X-ray imaging apparatus by finding a bad pixel during a calibration process of the detection unit 2 and by indicating the position of the found bad pixel. FIG. 2 is a view schematically illustrating an example of a pixel map (b). Each circle of FIG. 2 represents a pixel. A black circle (c) and a white circle (d) represent a bad pixel and a normal pixel, respectively. Such a pixel map (b) is used for image processing of an X-ray image. If the detection unit 2 outputs an electric signal corresponding to the X-ray transmission of an object, the control unit 3 performs pre-processing of the electric signal and the pixels corresponding to the electric signal for removing a bad pixel existing on an X-ray transmission image, and performs post-processing for enhancing a contrast, thereby producing a more clear X-ray transmission image. The pixel map (b) is used for the pre-processing for removing the bad pixel. That is, the control unit 3 recognizes a bad pixel (c) by use of the pixel map (b) and corrects the recognized bad pixel through a predetermined software algorithm, such as an image processing method known in the art. FIG. 3 illustrates views showing X-ray transmission images of a hand of a human, and illustrating correction of the X-ray transmission image to remove bad pixels. The drawing on the left side of FIG. 3 shows a region (a) where a bad pixel has occurred or has been generated. In an actual X-ray image, the bad pixel is represented as a white dot, such as one or more white pixels, brighter than a region surrounding the bad pixel. The drawing on the right side of FIG. 3 represents an image obtained by correcting the bad pixel through the pre-processing of the left-side image using the above described pixel map (b). For the sake of recognition and for illustrative purposes only for describing the present invention, the bad pixel in FIG. 3 is shown as being present in a region other than a hand as one example. However, in practice, the bad pixel may be present on a region of the X-ray transmission image corresponding to an object, such as a hand, and the bad pixel represented in the region of the object may interrupt an accurate diagnosis, thereby requiring the image processing described above.

When the X-ray imaging apparatus operates in practice, a bad pixel may occur at an unexpected time and position. That is, a bad pixel may occur in a region different from a position of a bad pixel indicated by the manufacturer on the pixel map (b). In order to correct a bad pixel generated in an unexpected manner, the bad pixel needs to be indicated on the pixel map (b). To this end, the manufacturer regularly visits a work site where the X-ray image apparatus is operated, and updates the pixel map (b) by performing a calibration on the pixel map (b) in the prior art. Such an update in the prior art requires the X-ray imaging apparatus to stop operation during the calibration and has a limitation that a bad pixel generated during the use of the X-ray imaging apparatus is not corrected before a following calibration is performed. The present invention provides a method of updating a pixel map capable of removing constraints associated with the above update. Hereinafter, a method of updating a pixel map will be described with reference to FIGS. 4 and 5A-5B.

Figure 4:
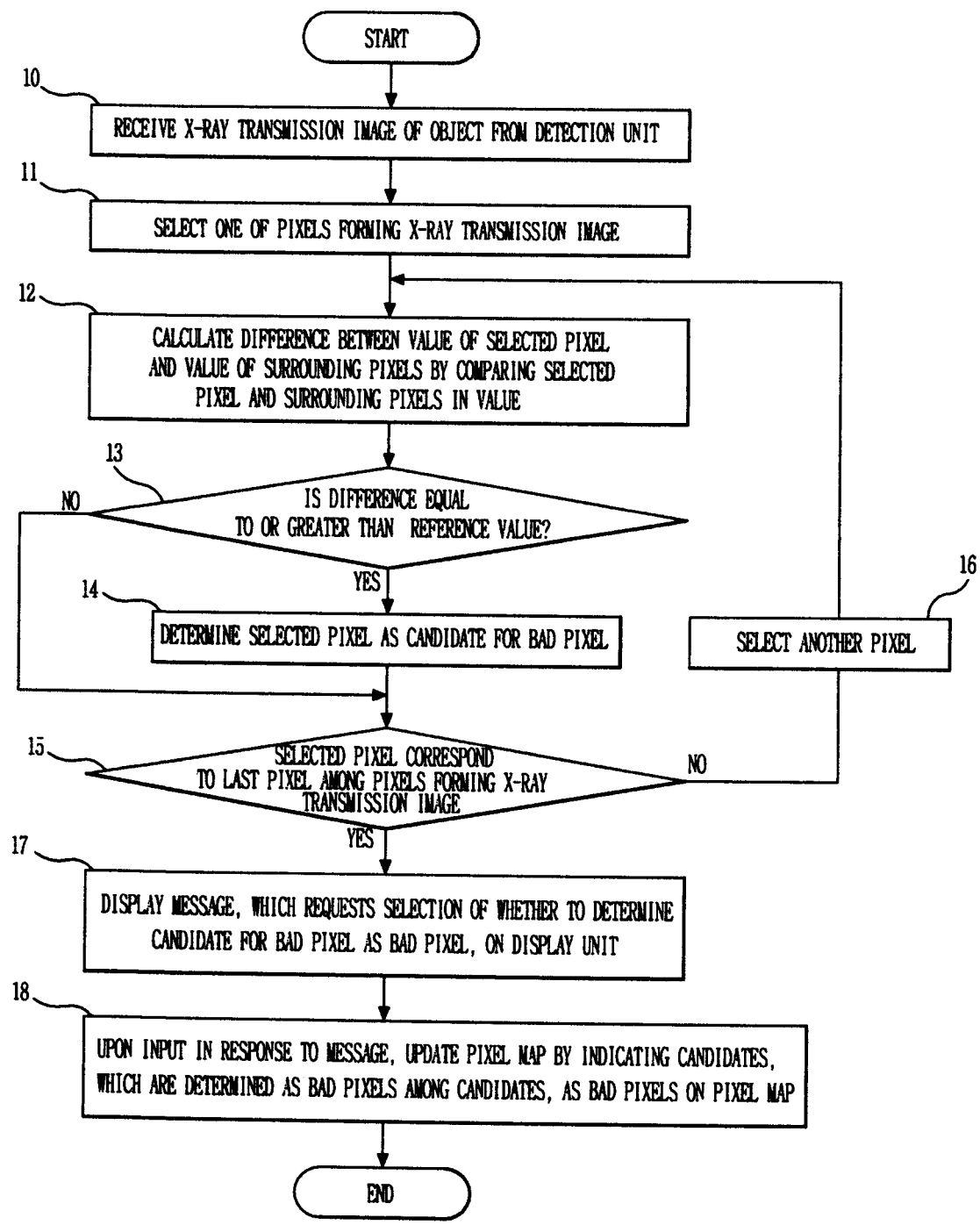
FIG. 4 is a flowchart illustrating a method of updating a pixel map according to the exemplary embodiment of the present invention.

FIG. 4 is a flowchart illustrating a method of updating a pixel map according to the exemplary embodiment of the present invention.

The control unit 3 receives an X-ray transmission image of an object from the detection unit 2 in step 10. The detection unit 2 detects the transmission of X-rays penetrating the object, converts the transmission of the X-rays into an electric signal representing an X-ray transmission image, and transmits the electric signal to the control unit 3.

Upon reception of the electric signal representing the X-ray transmission image of the object from the detection unit 2, the control unit 3 selects one of the pixels forming the X-ray transmission image in step 11.

Upon reception of the electric signal corresponding to the transmission of X-rays that have penetrated the object, the control unit 3 generates a X-ray transmission image of the object from the received electric signal and randomly selects a pixel among the pixels forming the X-ray transmission image.

After one of the pixels forming the X-ray transmission image is selected, the control unit 3 calculates a difference between a value of the selected pixel and a value of an area surrounding the selected pixel by comparing the value of the selected pixel with the value of the area surrounding the selected pixel in step 12. As defined and used herein, unless otherwise noted, the term "value" refers to a brightness value of a pixel. The area surrounding the selected pixel may be provided with at least one pixel, for example, eight pixels. The value of the pixel may be the value representing a brightness of the pixel. A bad pixel, which is visibly seen to be brighter than the surrounding region as described above, has a pixel value higher than the pixels surrounding the bad pixel. The control unit 3 calculates the difference between the value of the selected pixel and the value of each of the surrounding pixels by comparing the value of the selected pixel with the value of each of the surrounding pixels.

After the difference between the value of the selected pixel and the value of each of the surrounding pixels is calculated, the control unit 3 determines whether the difference is equal to or greater than a predetermined reference value in step 13. The control unit 3 determines whether the value of the selected pixel is greater than the value of each of the surrounding pixels by a reference value and a value greater than the reference value. The reference value may be set based on previous data or a test result and stored in the storage unit 4 in advance.

If the calculated difference is equal to or greater than the reference value, the control unit 3 determines the selected pixel as a candidate for a bad pixel in step 14. If the value of the selected pixel is greater than the values of the surrounding pixels by the reference value and a value greater than the reference value, the pixel is determined as a candidate for a bad pixel. Otherwise, in step 13, if the calculated difference is below the reference value in step 13, the selected pixel is not considered as a bad pixel, and the method proceeds to step 15. Referring to step 14, the control unit 3 stores information about the pixel, which is determined as the candidate for the bad pixel, in the storage unit 4. In this case, the selected pixel is determined to be only a candidate for a bad pixel, and so is not determined in step 14 to actually be a bad pixel, thereby allowing a user to confirm whether the selected pixel is a bad pixel. The determination of the bad pixel by a user will be described later in greater detail with reference to step 17.

If the selected pixel is determined as the candidate for the bad pixel in step 14, the control unit 3 determines whether the selected pixel is the last pixel among the pixels forming the X-ray transmission image in step 15. In order to perform the steps 12 to 14 in determining any candidates for bad pixels from among each of the pixels forming the X-ray transmission image, the method of the present invention needs to check whether the selected pixel corresponds to the last pixel forming the X-ray transmission image. The determining of whether the selected pixel is the last pixel is achieved by counting the number of the selected pixels and determining whether the number counted corresponds to the total number of pixels forming the X-ray transmission image.

If the selected pixel is determined as not being the last pixel forming the X-ray transmission image in step 15, the control unit 3 selects another pixel in step 16 and perform steps 12 to 14 to determine whether the selected other pixel is a candidate for a bad pixel. In this manner, the determination of a candidate for a bad pixel is performed on each of the pixels forming the X-ray transmission image.

If the selected pixel is the last pixel forming the X-ray transmission image, as determined in step 15, the control unit 3 displays a message, which requests a selection of whether to determine the candidate for the bad pixel as a bad pixel, on the display unit 7 in step 17. In case an error may be generated in determining a bad pixel by only using a predetermined software algorithm, an additional determination on a bad pixel is performed by a user. The control unit 3 displays a pixel map (b), as in FIG. 2, which indicates the candidate for the bad pixel such that a user is enabled to verify whether the candidate for the bad pixel corresponds to the bad pixel, and a message which requests a selection of whether to determine the indicated candidate for the bad pixel as the bad pixel, on the display unit 7. Such verification by a user is not limited thereto, and may be provided in various schemes. The user may determine a bad pixel from the candidates for the bad pixel and input a result of determination into the input unit 1.

If the result of the determination is input by the user in response to the message, the control unit 3 updates the pixel map (b) by indicating candidates, which are determined as bad pixels among the candidates for the bad pixels, as bad pixels on the pixel map (b) in step 18. The control unit 3 updates the information of the bad pixel of the pixel map (b) by representing candidates, which are determined as bad pixels, as bad pixels on the pixel map (b), and stores the updated pixel map (b) in the storage unit 4. The control unit 3 then performs image processing on the X-ray transmission image by use of the updated pixel map (b).

In an alternative embodiment, the predetermined software algorithm may operate to automatically determine which of the candidates are bad pixels without any input from the user, and so steps 17-18 may not be performed in the alternative embodiment of the present invention.

Figure 5A:
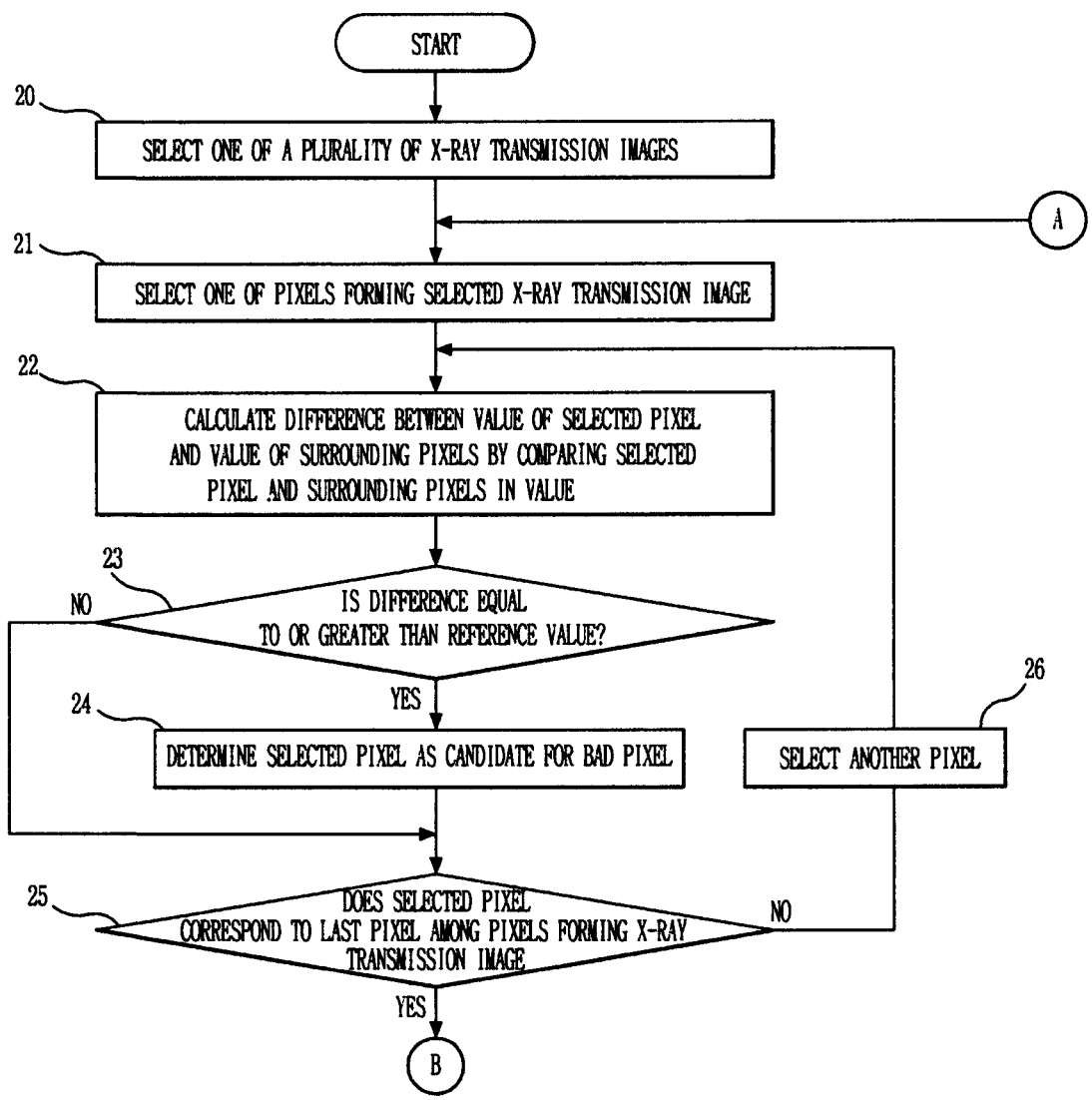
FIGS. 5A and 5B illustrate a flowchart showing a method of updating a pixel map according to an alternative exemplary embodiment of the present invention.
Figure 5B:
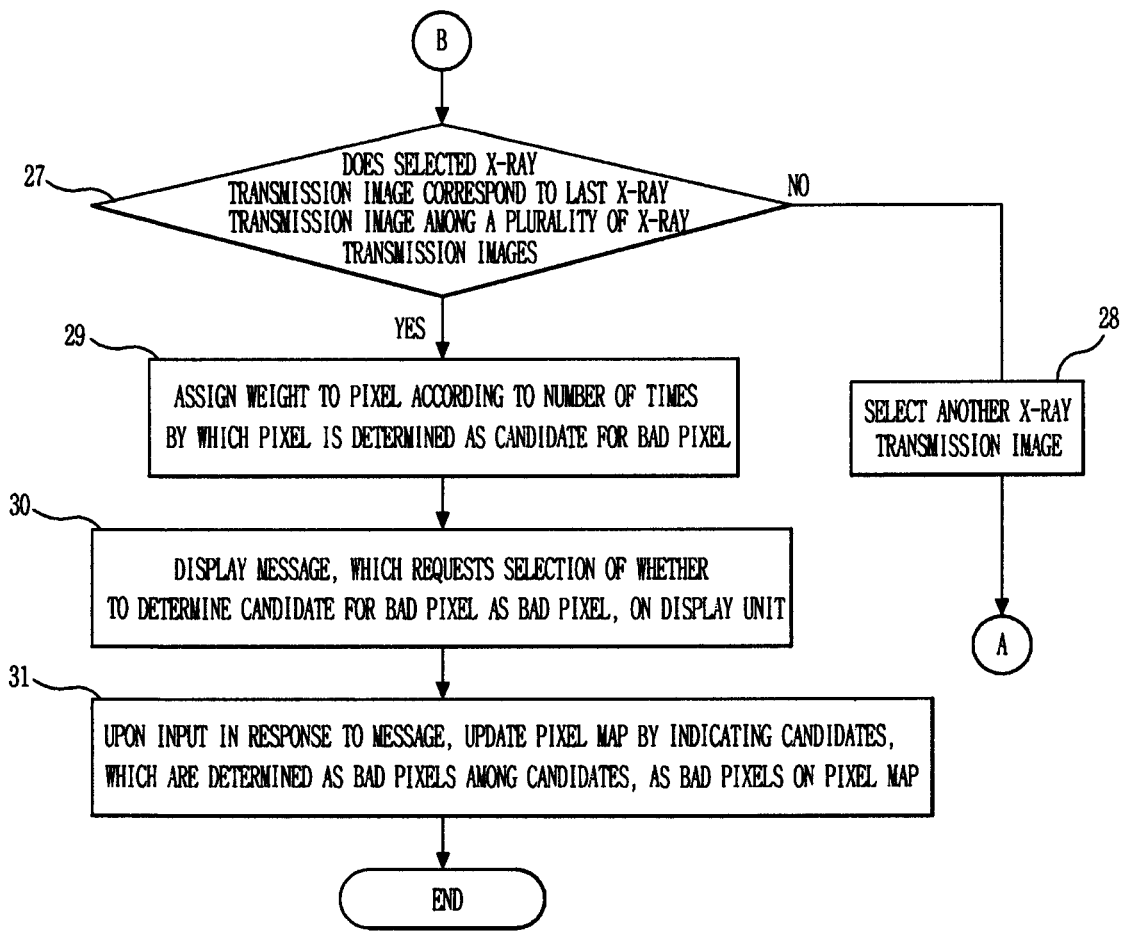

FIGS. 5A and 5B illustrate a flowchart showing a method of updating a pixel map according to an alternative exemplary embodiment of the present invention.

Referring to FIGS. 5A and 5B, the control unit 3 selects one of a plurality of X-ray transmission images that are stored in the storage unit 4 in step 20. The number of X-ray transmission images selected is not limited, but in an exemplary embodiment, the storage unit 4 can store a large number of images in a range between 10 to 100 in consideration of the time for updating the pixel map (b) and the accuracy in determining a bad pixel.

If one of the plurality of X-ray transmission images is selected, the control unit 3 selects one of the pixels forming the selected X-ray transmission image in step 21.

Once one of pixels forming the selected X-ray transmission image is selected, the control unit 3 calculates a difference between the value of the selected pixel and the value of an area surrounding the selected pixel by comparing the value of the selected pixel with the values of the area surrounding the selected pixel. The area surrounding the selected pixel may be provided with at least one pixel, for example, eight pixels. As described above, the value of the pixel is a value representing a brightness of the pixel. A bad pixel, which is visibly seen to be brighter than a surrounding region as described above, has a pixel value higher than all of the pixels surrounding the bad pixel. The control unit 3 calculates the difference between the value of the selected pixel and the value of each of the surrounding pixels by comparing the value of the selected pixel with the value of each of the surrounding pixels.

After the difference between the value of the selected pixel and the value of each of the surrounding pixels is calculated, the control unit 3 determines whether the difference is equal to a predetermined reference value or a value greater than the reference value in step 23. The control unit 3 determines whether the value of the selected pixel is greater than the value of each of the surrounding pixels by the reference value and the value greater than the reference value. The predetermined reference value may be set based on previous data or a test result and stored in the storage unit 4 in advance. If the calculated difference is not equal to or greater than the reference value, the method proceeds to step 25.

However, in step 23, if the calculated difference is equal to or greater than the reference value, the control unit 3 determines the selected pixel as a candidate for a bad pixel in step 24. If the value of the selected pixel is greater than the value of the surrounding pixels by the reference value and the value greater than the reference value, the pixel is determined as a candidate for a bad pixel. The control unit 3 stores information about the pixel, which is determined as the candidate for the bad pixel, in the storage unit 4.

If the selected pixel is determined as the candidate for the bad pixel, the control unit 3 determines whether the selected pixel is the last pixel among the pixels forming the X-ray transmission image in step 25. The determining of whether the selected pixel is the last pixel is achieved by counting the number of the checked selected pixels and determining whether the number counted corresponds to the total number of pixels forming the X-ray transmission image.

If the selected pixel is determined as not being the last pixel forming the X-ray transmission image in step 25, the control unit 3 selects another pixel in step 26 and perform the steps 22 to 24 to determine whether the next selected pixel is a candidate for a bad pixel. In this manner, the determination of a candidate for a bad pixel is performed on each of the pixels forming the current X-ray transmission image.

However, in step 25, if the selected pixel is determined as the last pixel forming the selected X-ray transmission image, the control unit 3 determines whether the selected X-ray transmission image is the last X-ray transmission image among the plurality of X-ray transmission images in step 27, shown in FIG. 5B. In order to perform the steps 22 to 24 of determining the candidate for the bad pixel on each of the plurality of X-ray transmission images, the method checks whether the selected X-ray transmission image corresponds to the last X-ray transmission image. The determining of whether the selected X-ray transmission image is the X-ray transmission image is achieved by counting a number, such as an index number, on the selected X-ray transmission image and determining whether the number of images counted corresponds to the total number of the plurality of X-ray transmission images. Since the determination of the candidate for the bad pixel is performed on each of the plurality of X-ray transmission images, the accuracy in determining the candidate for the bad pixel is enhanced.

If the selected X-ray transmission image is determined as not being the last X-ray transmission image among the plurality of X-ray transmission images in step 27, the control unit 3 selects another X-ray transmission image among the plurality of X-ray transmission images stored in the storage unit 4 in step 28 and performs steps 21 to 25 to determine a candidate for a bad pixel among pixels forming the newly selected X-ray transmission image. In this manner, the determination of a candidate for a bad pixel is performed on each of the plurality of X-ray transmission images.

However, in step 27, if the selected X-ray transmission image is the last X-ray transmission image among the plurality of X-ray transmission images, the control unit 3 assigns a weight to a pixel determined as a candidate for a bad pixel in step 29. The weight is a numerical value in proportion to the frequency of determinations by which the pixel is determined as a candidate for a bad pixel. As the determination of the candidates for the bad pixel is performed on the plurality of X-ray transmission images, a certain pixel may be determined as a candidate for a bad pixel in a number of times among all the pixels determined as the candidates for the bad pixels. The pixel determined as a candidate for a bad pixel for a number of times is considered as being determined with a higher accuracy. Therefore, the weight is assigned to a pixel according to the number of times by which the pixel is determined as a candidate for a bad pixel. For example, if a pixel is determined ten times to be a candidate for a bad pixel, such a bad pixel is assigned a weight higher than a weight assigned to a pixel that is determined only one time to be a candidate for a bad pixel.

If the assigning of a weight of the candidate for the bad pixel is finished in step 29, the control unit 3 displays a message, which requests a selection of whether to determine the candidate for the bad pixel as the bad pixel, on the display unit 7 in step 30.

In case that an error may be generated in determining a bad pixel only with a predetermined software algorithm, an additional determination of a bad pixel is performed by a user. The control unit 3 displays a pixel map (b), shown in FIG. 2, which indicates the candidate for the bad pixel such that a user is enabled to verify whether the candidate for the bad pixel corresponds to the bad pixel, and a message, which requests a selection of whether to determine the indicated candidate for the bad pixel as the bad pixel, on the display unit 7. Such a verification by a user is not limited thereto, and may be provided in various schemes. For example, a probability that a candidate for the bad pixel is a bad pixel may be indicated on the pixel map (b) and associated with the candidate to correspond to the weight of the candidate, so that a user easily determines whether the candidate is a bad pixel. A scheme of representing the weight assigned to the candidate is not limited thereto and may be provided in various schemes. The user determines a bad pixel from the candidate for bad pixel and inputs a result of determination into the input unit 1.

If a result of determination is input in response to the message, the control unit 3 updates the pixel map (b) by indicating candidates, which are determined as bad pixels among the candidates for the bad pixels, as bad pixels on the pixel map (b) in step 31 of FIG. 5B.

In another alternative embodiment, the predetermined software algorithm may operate to automatically determine which of the candidates are bad pixels without any input from the user, and so steps 30-31 may not be performed in the alternative embodiment of the present invention.

The control unit 3 updates bad pixel-information of the pixel map (b) by representing candidates, which are determined as bad pixels, as bad pixels on the pixel map (b), and stores the updated pixel map (b) in the storage unit 4. The control unit 3 then performs image processing on the X-ray transmission image by use of the updated pixel map (b).

The above-described apparatus and methods according to the present invention can be implemented in hardware, firmware or as software or computer code that can be stored in a recording medium such as a CD ROM, a RAM, a ROM, a floppy disk, DVDs, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of updating a pixel map, the method comprising:
   generating an X-ray transmission image by detecting an X-ray penetrating an object;
   determining whether a difference between a value associated with each one of the pixels forming the X-ray transmission image and a value associated with a nearby pixel adjacent to the each one of the pixels is equal to or greater than a predetermined reference value by comparing the value of the each one of the pixels with the value of the nearby pixel;
   determining a pixel having a value representing a difference equal to or greater than the reference value as a candidate for a bad pixel among the pixels if the difference is equal to or greater than the reference value;
   determining whether the candidate for the bad pixel is the bad pixel; and
   updating the pixel map in real time prior to performing image processing on the X-ray transmission image by use of the updated pixel map by showing the determined bad pixel on the pixel map if the candidate for the bad pixel is determined as the bad pixel.

2. The method of claim 1, wherein the step of determining whether the difference between the value of each one of the pixels forming the X-ray transmission image and the value of a nearby pixel adjacent to the each one of the pixels is equal to or greater than the reference value, includes determining whether a predetermined pixel among the pixels forming the X-ray transmission image is greater in value than the value of an area surrounding the predetermined pixel by the reference value and a value greater than the reference value.

3. The method of claim 2, wherein the area surrounding the predetermined pixel comprises at least one pixel.

4. The method of claim 1, wherein the step of determining the pixel having the value representing the difference equal to or greater than the reference value as the candidate for the bad pixel among the pixels if the difference is equal to or greater than the reference value, includes the step of determining a predetermined pixel among the pixels forming the X-ray transmission image as the candidate for the bad pixel if the predetermined pixel is greater in value than a value of an area surrounding the predetermined pixel by the reference value and a value greater than the reference value.

5. The method of claim 1, wherein the updating of the pixel map by showing the determined bad pixel on the pixel map if the candidate for the bad pixel is determined as the bad pixel comprises:
   updating the pixel map by indicating the determined bad pixel as the bad pixel on the pixel map; and
   storing the updated pixel map.

6. The method of claim 1, wherein the value associated with the pixel is a value representing a brightness of the pixel.

7. The method according to claim 1, wherein prior to determining whether the candidate for the bad pixel is the bad pixel, displaying a message which prompts a selection of whether to perform the determining as to whether the candidate for the bad pixel is the bad pixel.

8. The method of claim 7, wherein the step of displaying of the message requesting a selection of whether to determine the candidate for the bad pixel as the bad pixel, includes displaying, on a display unit:
   a pixel map, which indicates the candidate for the bad pixel such that a user is enabled to verify whether the candidate for the bad pixel corresponds to the bad pixel, and a message, which requests a selection of whether to determine the indicated candidate for the bad pixel as the bad pixel.

9. The method according to claim 1, wherein the determining that the candidate for the bad pixel is the bad pixel is performed automatically without user intervention.

10. An X-ray imaging apparatus comprising:
    a detection unit configured to detect an X-ray penetrating an object and to output an X-ray detection signal; and
    a control unit configured to generate an X-ray transmission image of the object from the X-ray detection signal that is output from the detection unit, to determine a candidate for a bad pixel with respect to each one of the pixels forming the X-ray transmission image, to determine whether the candidate for the bad pixel is the bad pixel, and to update a pixel map in real time prior to performing image processing on the X-ray transmission image by use of the updated pixel map by showing the determined bad pixel on the pixel map if the candidate for the bad pixel is determined as the bad pixel.

11. The X-ray imaging apparatus of claim 10, wherein the control unit determines whether a predetermined pixel of the pixels forming the X-ray transmission image is greater in an associated value than an associated value of an area surrounding the predetermined pixel by a predetermined reference value and a value greater than the reference value, and determines the predetermined pixel as the candidate for the bad pixel if the value of the predetermined pixel is equal to or greater than the value of an area surrounding the predetermined pixel by the reference value and a value greater than the reference value.

12. The X-ray imaging apparatus of claim 11, wherein the area surrounding the predetermined pixel comprises at least one pixel.

13. The X-ray image apparatus of claim 11, wherein the value associated with the pixel is a value representing a brightness of the pixel.

14. The X-ray image apparatus of claim 10, wherein the control unit displays a pixel map, which indicates the candidate for the bad pixel such that a user is enabled to verify whether the candidate for the bad pixel corresponds to the bad pixel, and a message, which requests a selection of whether to determine the indicated candidate for the bad pixel as the bad pixel, on a display unit.

15. The X-ray image apparatus of claim 10, wherein the control unit updates the pixel map by indicating the determined bad pixel as the bad pixel on the pixel map, and stores the updated pixel map.

16. The X-ray image apparatus of claim 10, wherein the controller is configured to display a message requesting a selection of whether to determine that the candidate for the bad pixel is the bad pixel.

17. The X-ray image apparatus of claim 10, wherein the controller is configured to determine automatically whether the candidate for the bad pixel is the bad pixel.

* * * * *

UNITED STATES PATENT AND TRADEMARK OFFICE
CERTIFICATE OF CORRECTION

| | | |
|---|---|---|
| PATENT NO. | : 8,903,148 B2 | Page 1 of 1 |
| APPLICATION NO. | : 13/541820 | |
| DATED | : December 2, 2014 | |
| INVENTOR(S) | : Ho Jun Lee et al. | |

It is certified that error appears in the above-identified patent and that said Letters Patent is hereby corrected as shown below:

In the Claims

Column 12, Claim 8, Line 3 should read as follows:
--…claim 7, wherein displaying…--

Signed and Sealed this
Twenty-eighth Day of April, 2015

Michelle K. Lee
*Director of the United States Patent and Trademark Office*